(12) United States Patent
Nagasaka et al.

(10) Patent No.: US 6,421,191 B1
(45) Date of Patent: Jul. 16, 2002

(54) APPARATUS FOR DRIVING AN OBJECTIVE LENS

(75) Inventors: Hideo Nagasaka, Kanagawa; Yasuo Osada, Saitama, both of (JP)

(73) Assignee: Sony Corporation, Tokyo (JP)

( * ) Notice: Subject to any disclaimer, the term of this patent is extended or adjusted under 35 U.S.C. 154(b) by 24 days.

(21) Appl. No.: 09/710,261

(22) Filed: Nov. 9, 2000

(30) Foreign Application Priority Data

Nov. 19, 1999 (JP) .............................................. 11-330495

(51) Int. Cl.[7] .............................. G02B 7/02; G11B 7/00
(52) U.S. Cl. ....................... 359/824; 359/813; 359/814; 369/44.15; 369/44.14; 369/219
(58) Field of Search ................................ 359/813, 814, 359/823, 824; 369/44.14, 44.15, 44.16, 219

(56) References Cited

U.S. PATENT DOCUMENTS

| | | | | |
|---|---|---|---|---|
| 5,373,496 A | * | 12/1994 | Tomita et al. .............. | 369/219 |
| 5,602,808 A | * | 2/1997 | Futagawa et al. ......... | 369/44.14 |
| 5,691,965 A | * | 11/1997 | Jansen et al. ............. | 369/44.14 |
| 5,719,834 A | * | 2/1998 | Futagawa et al. ......... | 369/44.14 |
| 6,330,120 B1 | * | 12/2001 | Shibusaka et al. .......... | 359/814 |

* cited by examiner

Primary Examiner—Loha Ben
(74) Attorney, Agent, or Firm—Oblon, Spivak, McClelland, Maier & Neustadt, P.C.

(57) ABSTRACT

An objective lens driving apparatus having a lens holder, elastic supports, and a drive unit. The lens holds an objective lens. The elastic supports are secured at one end to the lens holder and at the other end to a fixed section, thereby allowing the lens holder to move. The drive unit drives the lens holder in a direction parallel to an optical axis of the objective lens and in a plane perpendicular to the direction parallel to the optical axis. The drive unit has at least two magnets provided on the lens holder, a coil section secured to the fixed section, and a yoke. The yoke constitutes, a closed magnetic circuit, along with the magnets. In the drive unit, said at least two magnets are arranged, opposing each other, the coil section is located in a gap between said at least two magnets, and a center of the gap is aligned with a center of the coil section.

22 Claims, 7 Drawing Sheets

APPARATUS FOR DRIVING AN OBJECTIVE LENS

BACKGROUND OF THE INVENTION

1. Field of the Invention

The present invention relates to an apparatus for driving an objective lens. More particularly, the invention relates to an apparatus which drives an objective lens in a direction parallel to the optical axis of the objective lens and also in a direction perpendicular to the optical axis of the objective lens, or parallel to the surface of a disk.

2. Prior Art

Optical pickups are known, each designed to record data on, and reproduce from, an optical disk or a magneto-optical disk.

An optical pickup comprises an optical system and an objective lens driving apparatus. The optical system has an objective lens. The objective lens driving apparatus drives the objective lens in a direction parallel to the optical axis of the objective lens and a direction perpendicular to the optical axis of the objective lens.

The optical system further has a light source, a detector and various optical components. The light source emits a laser beam, which is applied through the objective lens to the data-recording region of an optical disk. The detector detects the light reflected from the data-recording region of the optical disk.

The objective lens driving apparatus has a lens holder, a holder support, a plurality of elastic supports, and an electromagnetic circuit unit. The lens holder holds the objective lens. The holder support supports the lens holder, allowing the lens holder to move. The elastic supports support the lens holder, too, allowing the same to move. The electromagnetic circuit unit drives the lens holder in a focusing direction and in a tracking direction. The focusing direction is parallel to the optical axis of the objective lens. The tracking direction is perpendicular to the tracking direction or parallel to the surface of the optical disk.

The lens holder is made of, for example, resin material. The lens holder has a lens-holding part that holds the objective lens. The holder support has a holder-supporting part that holds the lens holder. The holder support has an opening, through which the optical axis of the objective lens extends.

The elastic supports are wires made of elastic metal. They are secured at one end to the lens holder and at the other end to the holder-supporting part of the holder support. Thus, the elastic supports connect the lens holder to the holder-supporting part of the holder support. The lens holder can therefore be moved.

The electromagnetic circuit unit has a drive magnet, a drive coil, and a yoke. The drive magnet and the drive coil cooperate, generating an electromagnetic force. The yoke defines a magnetic circuit. The drive coil comprises a focusing coil and a tracking coil. The focusing coil generates a force that drives the lens holder in the above-mentioned focusing direction. The tracking coil generates a force that drives the lens holder in the aforementioned tracking direction.

The electromagnetic circuit unit may be of either of two known types. In the first type (hereinafter called "moving magnet type"), the drive magnet is mounted on the lens holder that is a movable component. In the second type (hereinafter called "moving coil type"), the drive coil is mounted on the lens holder.

In the optical pickup having the structure described above, the objective lens driving apparatus drives the lens holder in the focusing direction and the tracking direction. The objective lens, which is held by the lens holder, focuses the laser beam on a desired track provided in the data-recording region of the optical disk. Data is thereby recorded on, or reproduced from, the optical disk.

An objective lens driving apparatus of moving magnet type is advantageous over an objective lens driving apparatus of moving coil type. This is because the lines for supplying power to the drive coil of the electromagnetic drive unit need not be lead from the lens holder that is a movable component and would not hinder the moving of the lens holder. Objective lens driving apparatus of moving magnet type are used in increasing numbers, as the speed at which the optical disk is rotated increases.

However, the objective lens driving apparatus of moving magnet type is disadvantageous. It may likely generate a rotation moment since its movable component is relatively heavy.

To reduce the influence of a rotation moment, the center of gravity of the movable component, i.e., the lens holder, must be located on the optical axis of the objective lens. To this end, two parts of the electromagnetic circuit unit are arranged symmetrically with respect to the optical axis of the lens in most conventional objective lens driving apparatuses of moving magnet type. (Hereinafter, an electromagnetic circuit unit having parts thus arranged will be referred to as "balanced electromagnetic circuit unit.")

In the objective lens driving apparatus of moving magnet type that has a balanced electromagnetic circuit unit, the drive magnet and the yoke are mounted on the lens holder and positioned symmetrically with respect to the optical axis of the objective lens. Further, the drive coil is arranged on the holder support and opposes the drive magnet.

Two requirements must be fulfilled in the objective lens driving apparatus of moving magnet type that has a balanced electromagnetic circuit unit. First, the lens holder must be mounted on a shaft and needs to slides thereon. Second, the mirror that reflects the laser beam in the optical system must be arranged outside the drive coil of the electromagnetic circuit unit. Therefore, it is impossible to arrange the mirror right below the optical axis of the objective lens. The optical system including the mirror is inevitably large. This renders it difficult to provide a small and thin optical pickup.

BRIEF SUMMARY OF THE INVENTION

It is therefore an object of the present invention to provide an objective lens driving apparatus that is free of the problems described above.

According to the present invention, there is provided an objective lens driving apparatus including a lens holder, elastic supports, and a drive unit. The lens holds an objective lens. The elastic supports are secured at one end to the lens holder and at the other end to a fixed section, thereby allowing the lens holder to move. The drive unit drives the lens holder in a direction parallel to an optical axis of the objective lens and in a plane perpendicular to the direction parallel to the optical axis. The drive unit has at least two magnets provided on the lens holder, a coil section secured to the fixed section, and a yoke. The yoke constitutes, a closed magnetic circuit, along with the magnets. In the drive unit, said at least two magnets are arranged, opposing each other, the coil section is located in a gap between said at least two magnets, and a center of the gap is aligned with a center of the coil section.

According to the invention, there is provided an objective lens driving apparatus including a lens holder, elastic supports, and a drive unit. The lens holder holds an objective lens. The elastic supports are secured at one end to the lens holder and at the other end to a fixed section, thereby allowing the lens holder to move. The drive unit drives the lens holder in a direction parallel to an optical axis of the objective lens and in a plane perpendicular to the direction parallel to the optical axis. The drive unit has at least two magnets provided on the lens holder, a coil section secured to the fixed section, and a yoke. The yoke constitutes a closed magnetic circuit, along with the magnets. In the drive unit, said at least two magnets are arranged, opposing each other, the coil section is located in a gap between said at least two magnets, and a center of the coil section coincides with a gravity center of the lens holder.

DETAILED DESCRIPTION OF THE INVENTION

Figure 1:
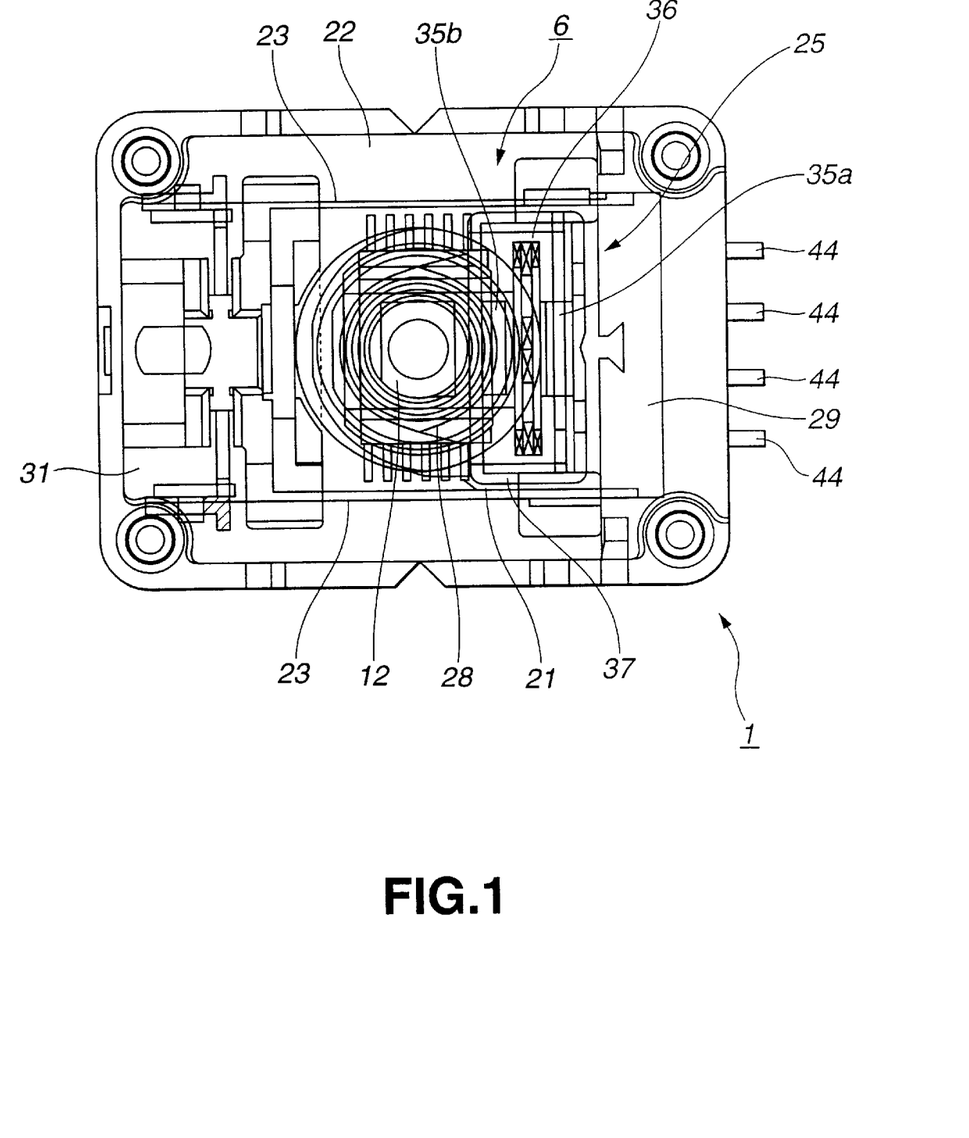
FIG. 1 is a plan view showing an optical pickup according to the present invention.
Figure 2:
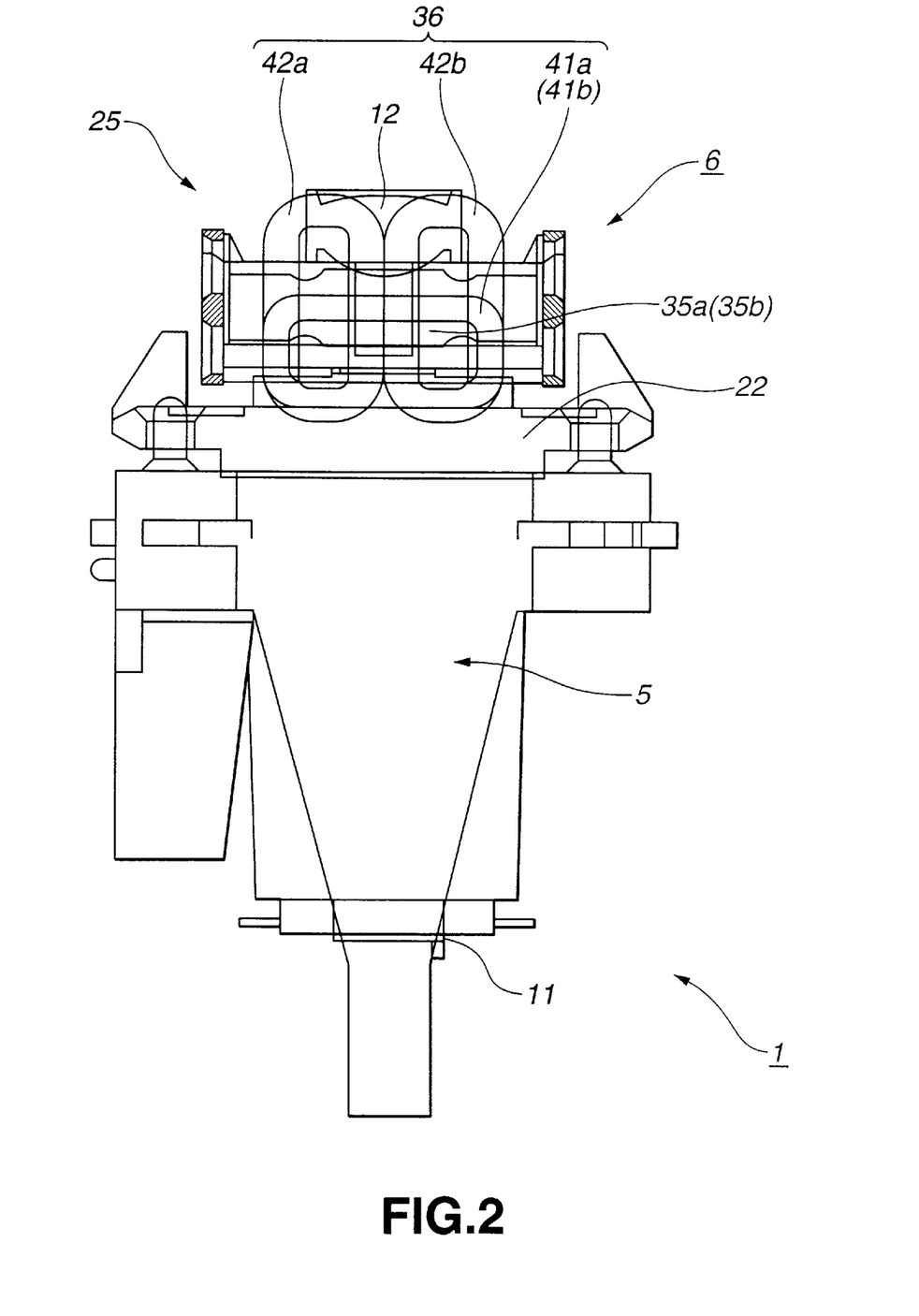
FIG. 2 is a side view of the optical pickup shown in FIG. 1.

An optical pickup to which this invention is applied will be described, with reference to the accompanying drawings. As shown in FIGS. 1 and 2, the optical pickup 1 comprises an optical system 5 and a lens driving apparatus 6. The optical system 5 includes an objective lens 12. The apparatus 6 drives the objective lens 12.

As shown in FIGS. 1 and 2, the optical system 5 has a light source 11, a detector, and various optical components. The light source 11 emits a laser beam. The laser beam is focused by the objective lens 12 and applied to the data-recording region of an optical disk. The detector (not shown) receives the light reflected from the data-recording region of the optical disk. Among the optical components is a mirror (not shown) that guides the laser beam emitted by the light source 11, to the objective lens 12.

As FIGS. 1 and 2 show, the objective lens driving apparatus 6 has a lens holder 21, a holder support 22, a plurality of elastic supports 23, and an electromagnetic circuit unit 25. The lens holder 21 holds the objective lens 12. The holder support 22 supports the lens holder 21, allowing the holder 12 to move. The elastic supports 23 support the lens holder 21 too, allowing the same to move. The electromagnetic circuit unit 25 drives the lens holder 21 in a focusing direction and in a tracking direction. The focusing direction is parallel to the optical axis of the objective lens 12. The tracking direction is perpendicular to the tracking direction or parallel to the surface of the optical disk.

Figure 3:
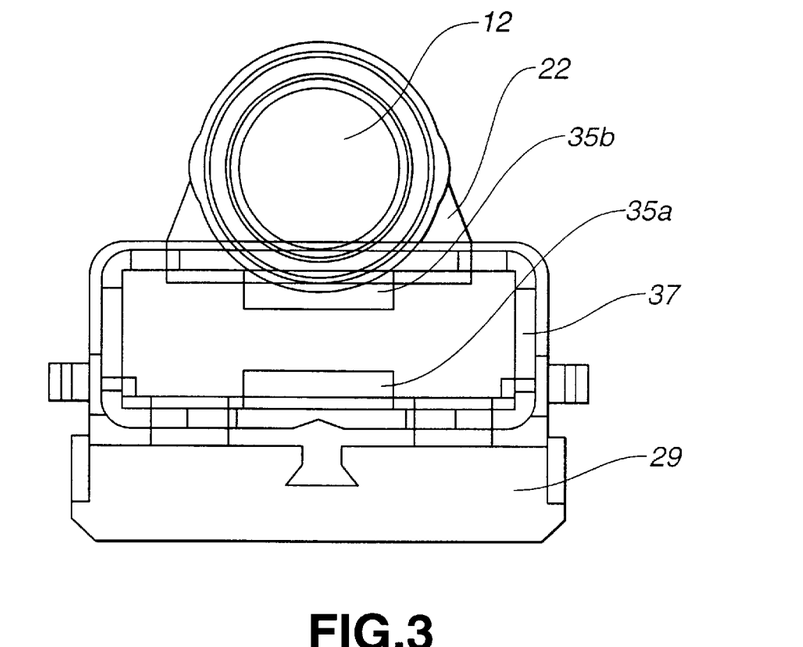
FIG. 3 is a plan view of the lens holder of the objective lens driving apparatus incorporated in the optical pickup.
Figure 4:
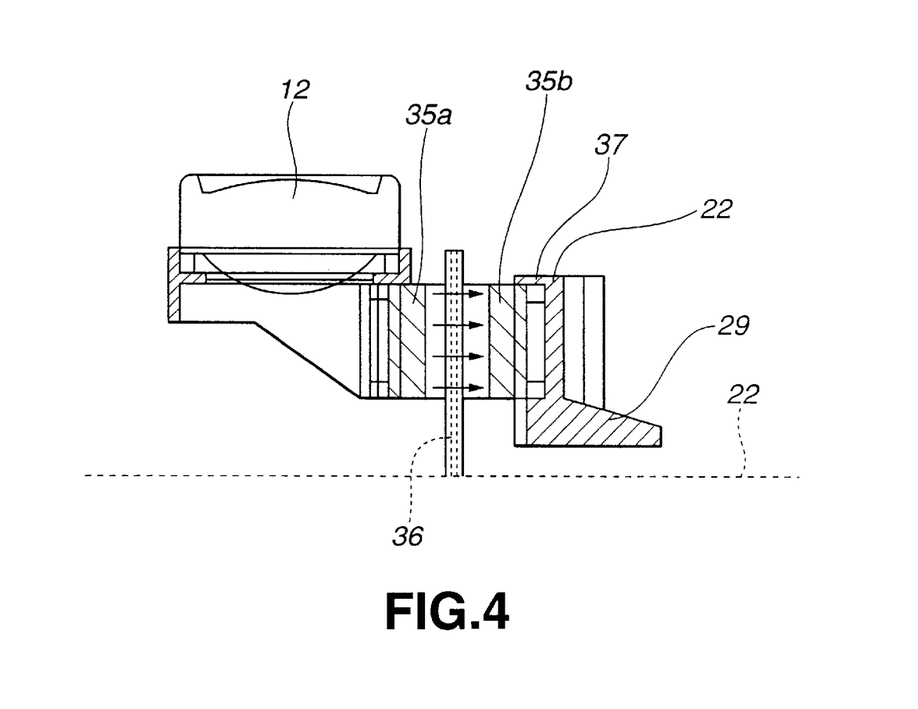
FIG. 4 is a vertical sectional view of the lens holder.

The lens holder 21 is made of, for example, resin material such as thermoplastic resin. As FIGS. 3 and 4 show, the yoke 37 of the electromagnetic circuit unit 25 is embedded in the lens holder 21. The yoke 37 is made of metal. The yoke 37, which is made integral with the lens holder 21, serves as a member reinforcing the lens holder 21. The lens holder 21 is mechanically strong and stiff enough to have a sufficiently high resonance frequency.

A lens-holding part 28 shaped like a hollow cylinder is formed integral with the lens holder 21 and surrounds the yoke 37. The lens-holding part 28 holds the objective lens 12. A gravity-center adjusting part 29 is formed integral with the lens holder 21, protrudes therefrom, and opposes the lens-holding part 28 across the yoke 37. The gravity-center adjusting part 29 adjusts the gravity center of the lens holder 21 that is a movable component.

The holder support 22 is made of, for example, resin material. It has a support part 31 that supports the elastic supports 23, which in turn support the lens holder 21. The holder support 22 has an opening 32, through which the optical axis of the objective lens 12 extends.

The elastic supports 23 are wires made of elastic metal. They are secured at one end to the outer circumferential surface of the lens holder 21 and at the other end to the holder-supporting part 31 of the holder support 22. They are so secured by the use of, for example, adhesive. Thus, the elastic supports 23 connect the lens holder 21 to the holder-supporting part 31 of the holder support 22. The lens holder 21 can therefore be moved.

Figure 5:
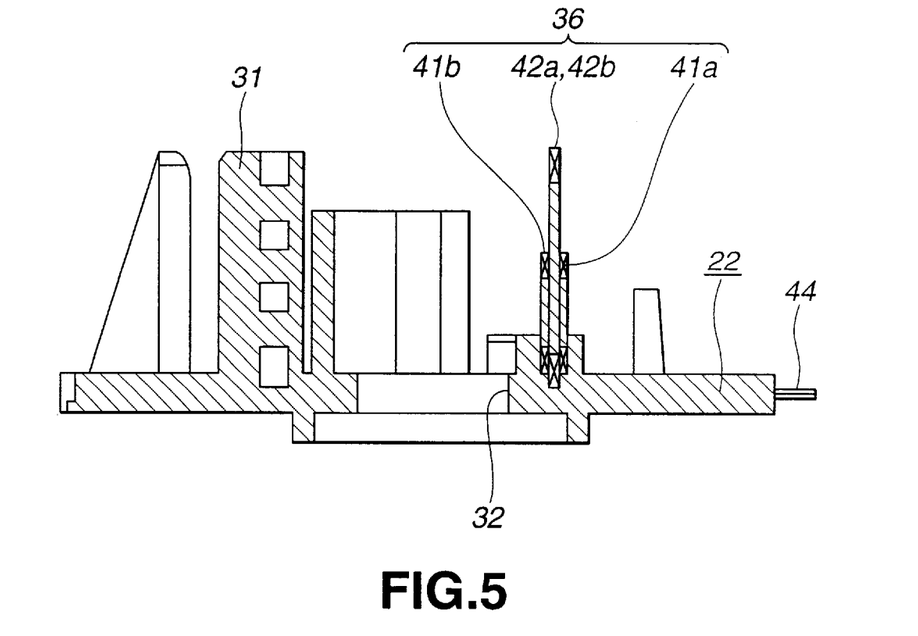
FIG. 5 is a sectional view illustrating the holder support and electromagnetic circuit unit that are incorporated in the objective lens driving apparatus.

As shown in FIG. 1, the electromagnetic circuit unit 25 is located near the lens-holding part 28 of the lens holder 21. As illustrated in FIGS. 1, 3 and 5, the electromagnetic circuit unit 25 has two drive magnets 35a and 35b and a drive coil 36, besides the yoke 37. The drive magnets 35a and 35b and the drive coil 36 cooperate, generating an electromagnetic force. The yoke 37 defines a closed magnetic circuit. The drive magnets 35a and 35b are, for example, neodymium magnets. As FIGS. 3 and 4 show, the magnets 35a and 35b are mounted on the yoke 37 and oppose each other. The drive magnets 35a and 35b are secured to the yoke 37 with, for example, adhesive.

As described above and as shown in FIGS. 3 and 4, the yoke 37 is embedded in the lens holder 21, constituting a closed magnetic in the lens holder 21 that is a movable component. The closed magnetic circuit can increase the permeance coefficient of both drive magnets 35a and 35b. Hence, the drive magnets 35a and 35b have stable magnetic property even if the temperature rises. In other words, they are heat-resistant. The magnets 35a and 35b can therefore be inserted into the lens holder 21, making it unnecessary to apply adhesive or the like to secure them to the yoke 37. If the magnets 35a and 35b are inserted in the lens holder 37, they will not be displaced even if the temperature rises when data is reproduced from the optical disk.

The drive coil 36 is inserted in the holder support 22 and made integral therewith. (As indicated above, the holder support 22 is made of resin material.) The drive coil 36 is therefore positioned with respect to the holder support 22 with high precision, because the mold used to form the holder support 22 has high dimensional precision.

Figure 6:
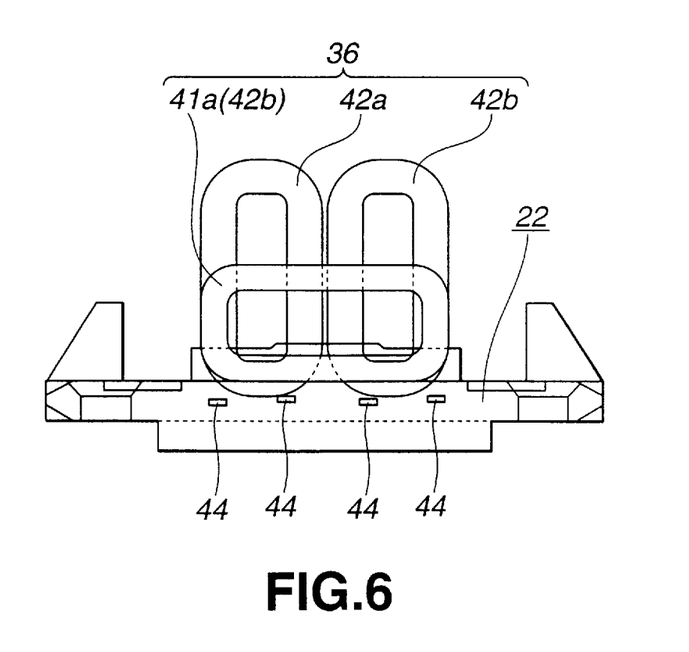
FIG. 6 is a front view of the drive coil provided in the electromagnetic circuit unit.

As shown in FIGS. 5 and 6, the drive coil 36 has two focusing coils 41a and 41b and two tracking coils 42a and 42b. The focusing coils 41a and 41b generate a force that drives the lens holder 37 in the focusing direction. The tracking coil 42a and 42b generate a force that drives the lens holder 37 in the tracking direction. The coils 41a, 41b, 42a and 42b are air-core coils, each made of a wire wound around no coil. Rather, they surround the holder support 22 that is made of resin and are formed integral with the holder support 22. Alternatively, the drive coil 36 may be a printed circuit that has a pattern of conductors.

Since the focusing coils 41a and 41b and the tracking coils 42a and 42b are air-core coils, their inductance can be low. This reduces the phase changes in both the focusing-servo band and the tracking-servo band and, ultimately simplifies the focusing servo system and the tracking servo system.

Figure 7:
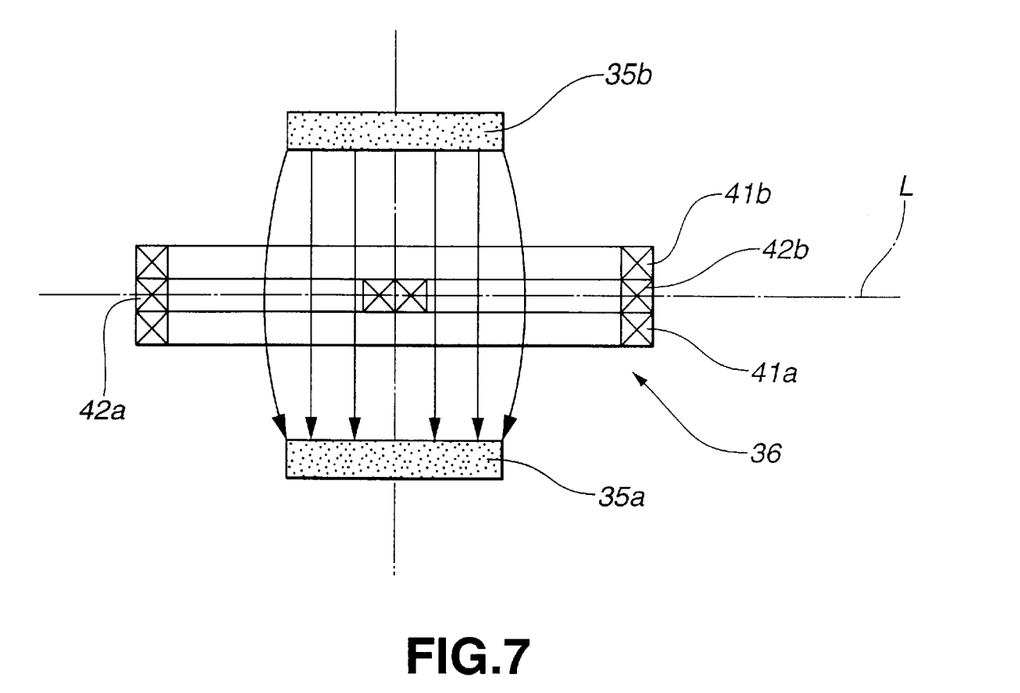
FIG. 7 is a plan view showing the focusing coil and tracking coil that constitute the drive coil.

As shown in FIGS. 5, 6 and 7, the tracking coils 42a and 42b are arranged in a line L that extends at right angles to the optical axis of the objective lens 12. The focusing coils 41a and 41b are interposed between the tracking coils 42a and 42b and oppose the tracking coils 42a and 42b, respectively.

As shown in FIG. 7, the tracking coils 42a and 42b are arranged, with their centers aligned with the midpoint in the magnetic gap between the drive magnets 35a and 35b. As shown in FIGS. 5 and 6, the focusing coils 41a and 41b are located near the major surface of the holder support 22 and arranged symmetrical to each other with respect to the midpoint in the magnetic gap between the drive magnets 35a and 35b.

In the objective lens driving apparatus 6, the gravity-center adjusting part 29 adjusts the gravity center of the lens holder 21 (i.e., movable component) that holds the objective lens 12, yoke 37 and drive magnets 35a and 35b. The gravity center of the lens holder 21 is thereby aligned with the common center of the tracking coils 42a and 42b, i.e., the center of the drive coil 36. In other words, the drive coil 36 is positioned on the holder support 22, with the common center of the tracking coils 42a and 42b aligned with the gravity center of the lens holder 21 that is a movable component.

Since the gravity center of the lens holder 21 aligns with the center of the drive coil 36, no rotation moment is generated while the objective lens driving apparatus 6 is operating. As described above, the focusing coils 41a and 41b are arranged symmetrical to each other, with the tracking coils 42a and 42b interposed between them. Hence, the drive forces generated when the magnetic fluxes are bent or distorted at an end of the magnetic fields generated by the drive magnets 35a and 35b act in opposite directions and cancel out each other.

The electromagnetic circuit unit 25 has four connection terminals 44 for supplying electric power to the drive coil 36. As shown in FIGS. 1, 5 and 6, the connection terminals 44 are positioned at a side of the holder support 22 and inserted in part in the holder support 22. The terminals 44 protrude outwards from the holder support 22. In the holder support 22, the terminals 44 are electrically connected to ends of the focusing coils 41a and 41b and tracking coils 42a and 42b, respectively. This reliably prevents the ends of the coils 41a, 41b, 42a and 42b from being damaged. This also makes it easy to assemble the electromagnetic circuit unit 25.

The yoke 37 is a rectangular frame made by processing a metal plate, such as a stainless steel plate. It is embedded in the lens holder 21, reinforcing the lens holder 21, or increasing the mechanical strength thereof. The yoke 37, which is rigid and reinforces the lens holder 21, suppresses the higher resonance at the lens holder 21 during focusing servo control and tracking servo control. The drive magnets 35a and 35b are secured to the inner opposite sides of the yoke 37, respectively.

Although not shown, the lens-holding part 28 may be formed integral with the yoke 37. The objective lens and an optical iris, both made of light-transmitting synthetic resin, may be formed integral with the lens holder 21.

In the objective lens driving apparatus 6 described above, a magnetic force acts on the drive coil 36 of the electromagnetic circuit unit 25. The magnetic force will be explained, with reference to the drawings.

Figure 8:
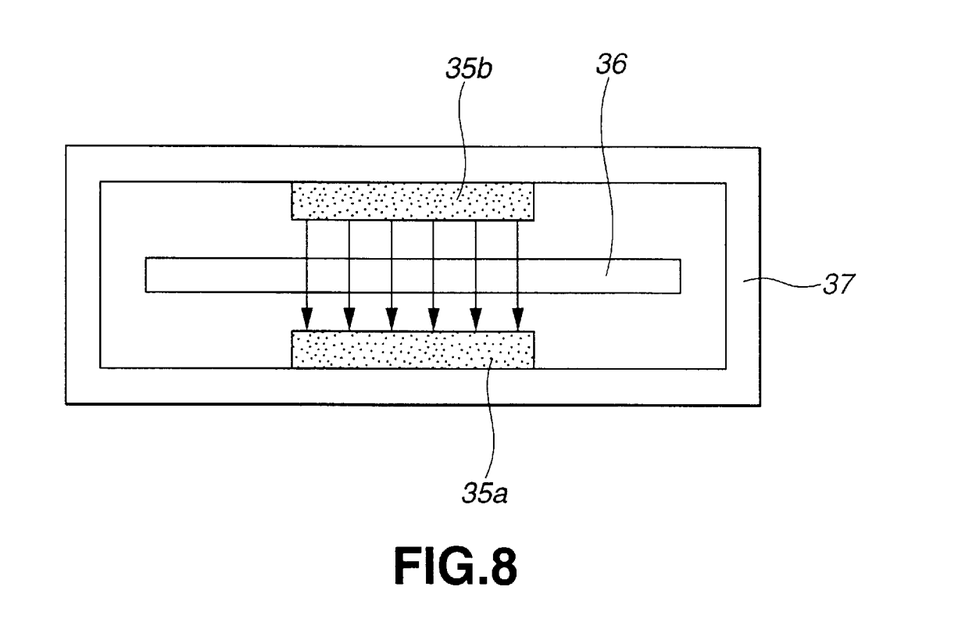
FIG. 8 is a plan view depicting the yoke and drive magnet of the electromagnetic circuit unit.
Figure 9A:
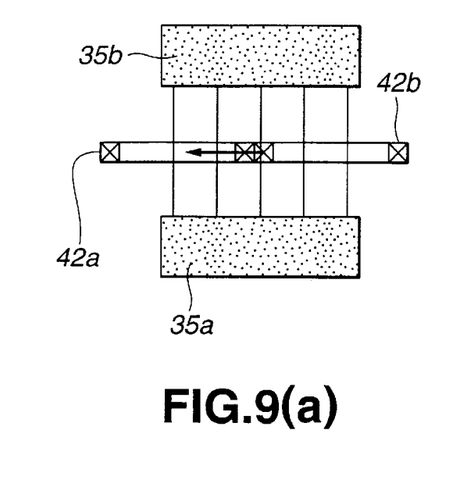
FIGS. 9(a) and 9(b) are diagrams explaining how a drive force acts on the drive coil of the electromagnetic circuit unit.
Figure 9B:
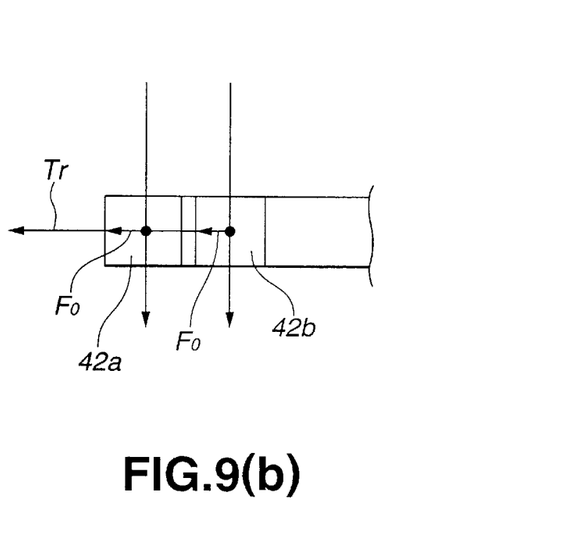

As FIGS. 8, 9(a) and 9(b) show, the drive coil 36 exists in a magnetic field that consists of only the parallel magnetic fluxes generated by the drive magnets 35a and 35b. Theoretically, the drive coil 36 generates two forces that act in the focusing direction and tracking direction, respectively, when an electric current flows through the drive coil 36 in the direction perpendicular to the magnetic fluxes, That is, as the current flows through the tracking coils 41a and 41b in the direction perpendicular to the plane of the drawing, the electromagnetic circuit unit 25 generates a drive force $F_0$ that is parallel to the tracking direction Tr.

Figure 10A:
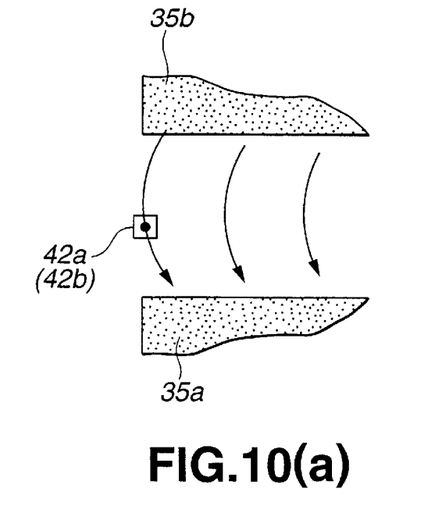
FIGS. 10(a) and 10(b) are diagrams explaining how a drive force is canceled by the magnetic flux at an end of the magnetic field generated by the drive magnet of the electromagnetic circuit unit.
Figure 10B:
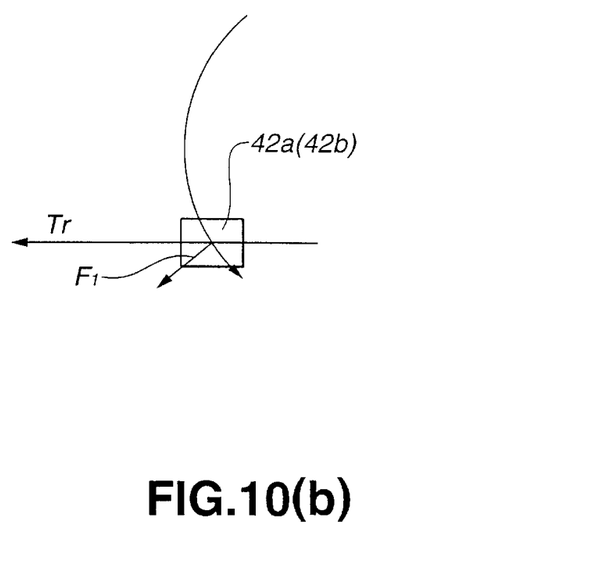

In practice, however, the electromagnetic circuit unit 25 cannot generate a magnetic field that consists of parallel magnetic fluxes only. The magnetic fluxes the unit 25 generates are bent at ends as shown in FIGS. 10(a) and 10(b). The drive force generated by the end portions of the magnetic fluxes inevitably acts slantwise to the focusing direction or tracking direction. Consequently, the electromagnetic circuit unit 25 generates a rotation moment. More specifically, an electric current flows in the tracking coils 42a and 42b in a direction perpendicular to the plane of the drawing, due to the end portions of the magnetic fluxes. The electromagnetic circuit unit 25 therefore generates a drive force $F_1$ that acts slantwise to the tracking direction Tr as shown in FIGS. 10(a) and 10(b).

In the electromagnetic circuit unit 25 of the invention, the drive magnets 35a and 35b oppose each other, arranged symmetrically with respect to a plane. Thus, the drive magnets 35a and 35b generate two magnetic fields that are symmetrical to the center of a so-called "magnetic gap." These magnetic fields extend parallel to said plane and are spaced therefrom at the same distance.

Figure 11A:
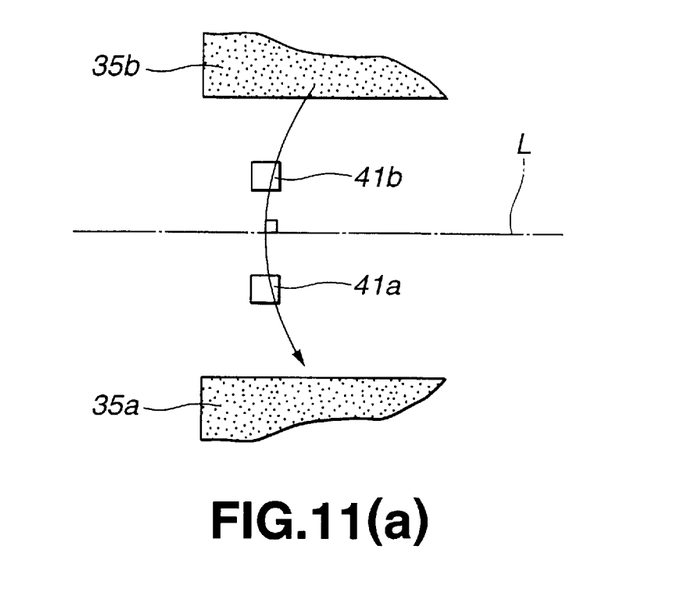
FIGS. 11(a) and 11(b) are diagrams explaining the operation of canceling the drive force by the magnetic flux at an end of the magnetic field generated by the drive magnet.
Figure 11B:
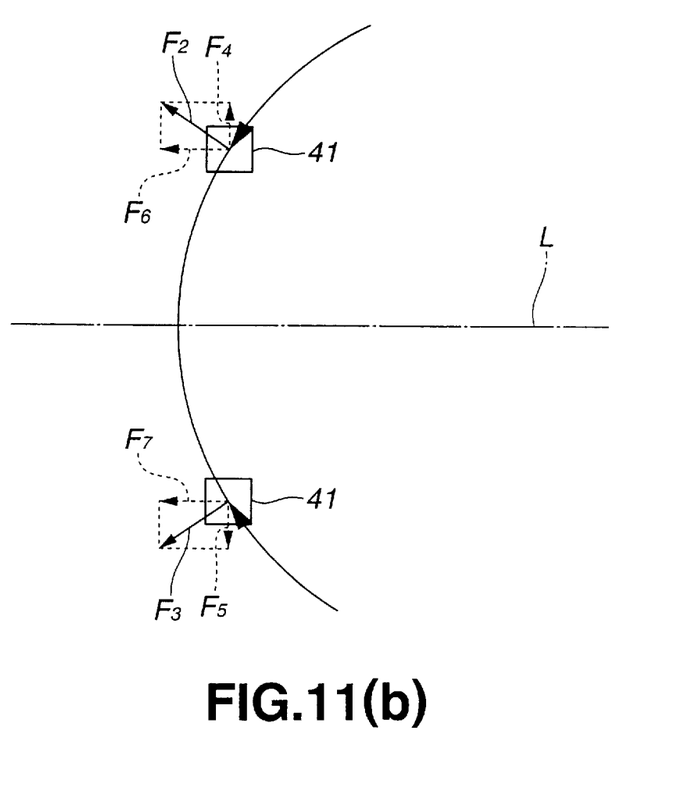

Namely, the drive coil 36 is located at the center of the magnetic field generated by the drive magnets 35a and 35b as is illustrated in FIGS. 11(a) and 11(b). Hence, the two drive forces acting slantwise to the focusing direction or tracking direction are symmetrical to the centerline L of the magnetic gap and, therefore, cancel out each other. As a result, only one drive force is generated, which acts in the focusing direction or tracking direction. When currents flow in the focusing coils 41a and 41b in the direction perpendicular to the plane of the drawing, the coils 41a and 41b generates drive forces $F_2$ and $F_3$, respectively, as shown in FIGS. 11(a) and 11(b). The components $F_4$ and $F_5$ of the drive forces $F_2$ and $F_3$ act in the opposite directions and cancel out each other. There exist only the other components $F_6$ and $F_7$ of the drive forces $F_2$ and $F_3$, which act in directions parallel to the focusing direction Fc.

In the optical pickup 1 constructed as described above, the objective lens driving apparatus 6 drives the lens holder 21 holding the objective lens 12, in the focusing direction and the tracking direction. The objective lens 12 is therefore moved in the focusing direction and tracking direction, focusing the laser beam on a desired recording track provided in the data-recording region of the optical disk. Data is thereby recorded on the optical disk or reproduced from the optical disk.

In the electromagnetic circuit unit 25, the drive coil 36 is arranged, with its center aligned with the center of the magnetic gap between the drive magnets 35a and 35b opposing each other. Thus, the drive forces, which are generated from the magnetic fluxes that are bent at an end of the magnetic fields generated by the drive magnets 35a and 35b, cancel out each other. This reliably prevents generation of a rotational moment in the electromagnetic circuit unit 25. No resonance will therefore be generated at all.

The drive coil 36 has its center aligned with the gravity center of the lens holder 21 that is a movable component. That is, the gravity center of the movable component coincides with the center of the drive coil 36. Hence, no rotation moments are generated when the lens holder 21 is driven and moved.

As indicated above, the electromagnetic circuit unit 25 is located, with its center on the centerline L of the magnetic gap between the drive magnets 35a and 35b that oppose each other in the lens driving apparatus 6. Thus, the drive forces generated at an end of the magnetic fields generated by the magnets 35a and 35b cancel out each other. No rotation moments will therefore be generated during the focusing servo control and tracking servo control. This can prevent higher resonance from occurring at the lens holder 21.

The lens driving apparatus 6 described above is an unbalanced type, wherein the electromagnetic circuit unit 25 is arranged on one side of the optical axis of the objective lens 12. Unlike in the objective lens driving apparatus that is a balanced type, the mirror for guiding the laser beam can be arranged right below the objective lens 12 held by the lens holder 21. The optical pickup 1 can therefore be smaller and thinner than otherwise.

As described above, the drive coil 36 is inserted in, and formed integral with, the holder support 22 in the lens driving apparatus 6. It follows that the positioning of the drive coil 36 depends on the dimensional precision of the mold used to form the holder support 22. The drive coil 36 can be positioned with higher accuracy than in the case where it is secured in position with adhesive or the like. Since the drive coil 36 is formed integral with the holder support 22, it is easy to assemble the lens driving apparatus 6. This reduces the manufacturing cost of the lens driving apparatus 6. Further, the drive coil 36 will not be displaced despite the environmental changes that may occur in the course of, for example, reproducing data from the optical disk, because it is formed integral with the holder support 22.

Since the drive coil 36 is inserted in the holder support 22, adhesive need not be applied to secure the coil 36 to the holder support 22. Moreover, the drive coil 36 is positioned with high precision, because the mold used to form the holder support 22 has high dimensional precision. Hence, the lens driving apparatus 6 can be manufactured in a relatively simple method.

The lens driving apparatus 6 can suppress generation of divided resonance and higher resonance when the lens holder 21 is driven. This is because the yoke 37 is inserted in and made integral with the lens holder 21, enhancing the rigidity of the lens holder 21.

The present invention is not limited to the embodiment described above. Rather, various changes and modification can be made without departing from the scope and spirit of the present invention.

What is claimed is:

1. An objective lens driving apparatus comprising:

a lens holder for holding an objective lens;

elastic supports secured at one end to the lens holder and at the other end to a fixed section, thereby allowing the lens holder to move; and a drive unit for driving the lens holder in a direction parallel to an optical axis of the objective lens and in a plane perpendicular to the direction parallel to the optical axis, said drive unit having at least two magnets provided on the lens holder, a coil section secured to the fixed section, and a yoke constituting, along with the magnets, a closed magnetic circuit, wherein said at least two magnets are arranged, opposing each other, the coil section is located in a gap between said at least two magnets, and a center of the gap is aligned with a center of the coil section.

2. The objective lens driving apparatus according to claim 1, wherein the coil section comprises a tracking coil section and a focusing coil section, and a center the tracking coil section has with respect to thickness coincidence with a center of a magnetic gap between said at least two magnets.

3. The objective lens driving apparatus according to claim 2, wherein the tracking coil section is aligned with a gravity center of the lens holder.

4. The objective lens driving apparatus according to claim 2, wherein the focusing coil section comprises at least two focusing coils which oppose each other, across the tracking coil section, and which are positioned symmetrically with respect to the center of the magnetic gap.

5. The objective lens driving apparatus according to claim 4, wherein the coil section is formed integral with the fixed section.

6. The objective lens driving apparatus according to claim 5, wherein the fixed section has a plurality of terminals which are connected at one end to the coil section and which protrude at the other end, and the terminals are electrically connected to the coil section within the fixed section.

7. The objective lens driving apparatus according to claim 1, wherein the yoke is formed integral with the lens holder.

8. The objective lens driving apparatus according to claim 1, wherein the magnets are formed integral with the yoke.

9. The objective lens driving apparatus according to claim 1, wherein the lens holder is made of resin.

10. The objective lens driving apparatus according to claim 1, wherein the lens holder has a gravity-center adjusting part that makes a gravity center of a section composed of the objective lens, said at least two magnets, the yoke and the lens holder coincide with a center of the coil section.

11. The objective lens driving apparatus according to claim 10, wherein the coil section has a tracking coil section, and the gravity-center adjusting part makes a gravity center of the lens holder coincide with a gravity center of the tracking coil section.

12. The objective lens driving apparatus according to claim 1, wherein the coil section comprises air-core coils, each made of a wire wound around no core.

13. An objective lens driving apparatus comprising:

a lens holder for holding an objective lens;

elastic supports secured at one end to the lens holder and at the other end to a fixed section, thereby allowing the lens holder to move; and a drive unit for driving the lens holder in a direction parallel to an optical axis of the objective lens and in a plane perpendicular to the direction parallel to the optical axis, said drive unit having at least two magnets provided on the lens holder, a coil section secured to the fixed section, and a yoke constituting, along with the magnets, a closed magnetic circuit, wherein said at least two magnets are arranged, opposing each other, the coil section is located in a gap between said at least two magnets, and a center of the coil section coincides with a gravity center of the lens holder.

14. The objective lens driving apparatus according to claim 13, wherein the coil section comprises a tracking coil section and a focusing coil section, and a center the tracking coil section has with respect to thickness coincidence with a center of a magnetic gap between said at least two magnets.

15. The objective lens driving apparatus according to claim 14, wherein the center of the tracking coil section coincides with a gravity center of a section composed of the objective lens, said at least two magnets, the yoke and the lens holder.

16. The objective lens driving apparatus according to claim 14, wherein the focusing coil section comprises at least two focusing coils which oppose each other, across the tracking coil section, and which are positioned symmetrically with respect to the center of the magnetic gap.

17. The objective lens driving apparatus according to claim 13, wherein the coil section is formed integral with the fixed section.

18. The objective lens driving apparatus according to claim 17, wherein the fixed section has a plurality of terminals which are connected at one end to the coil section and which protrude at the other end, and the terminals are electrically connected to the coil section within the fixed section.

19. The objective lens driving apparatus according to claim 13, wherein the yoke is formed integral with the lens holder.

20. The objective lens driving apparatus according to claim 19, wherein the magnets are formed integral with the yoke.

21. The objective lens driving apparatus according to claim 13, wherein the lens holder is made of resin.

22. The objective lens driving apparatus according to claim 13, wherein the coil section comprises air-core coils, each made of a wire wound around no core.

* * * * *

UNITED STATES PATENT AND TRADEMARK OFFICE
CERTIFICATE OF CORRECTION

PATENT NO. : 6,421,191 B1
DATED : July 16, 2002
INVENTOR(S) : Hideo Nagasaka et al.

It is certified that error appears in the above-identified patent and that said Letters Patent is hereby corrected as shown below:

<u>Column 8,</u>
Line 24, after "center", insert -- of --.

<u>Column 9,</u>
Line 15, after "center", insert -- of --.

Signed and Sealed this

Twenty-fifth Day of February, 2003

JAMES E. ROGAN
*Director of the United States Patent and Trademark Office*